United States Patent [19]
Lyons

[11] Patent Number: 6,047,064
[45] Date of Patent: Apr. 4, 2000

[54] HANDS FREE PHONE SYSTEM

[76] Inventor: Dennis K. Lyons, 6202 Wickham Rd., Sycamore, Ohio 44882

[21] Appl. No.: 09/022,371

[22] Filed: Feb. 12, 1998

[51] Int. Cl.[7] .................................................. H04M 1/00
[52] U.S. Cl. ........................... 379/446; 379/454; 379/455
[58] Field of Search ..................... 379/430, 446, 379/455, 447, 454; 455/575, 90; 343/715

[56] References Cited

U.S. PATENT DOCUMENTS

| | | | |
|---|---|---|---|
| 4,692,770 | 9/1987 | Kadokura | 343/715 |
| 5,388,155 | 2/1995 | Smith | 379/455 |
| 5,757,934 | 5/1998 | Yokoi | 379/430 |

*Primary Examiner*—Jack Chiang

[57] ABSTRACT

A hands free phone system is provided including a phone unit adapted for transmitting and receiving audio signals between a user and free space. An arm-mounted housing is provided for maintaining the phone unit on a user. A head set includes a resilient U-shaped head mount having an end with an earphone for transmitting signals and a microphone for receiving signals. The earphone and microphone are both coupled to a wire which in turn is coupled to the phone unit for communicating audio signals.

6 Claims, 2 Drawing Sheets

HANDS FREE PHONE SYSTEM

BACKGROUND OF THE INVENTION

1. Field of the Invention

The present invention relates to head sets and more particularly pertains to a new hands free phone system for allowing convenient mobile hands free communication with a phone.

2. Description of the Prior Art

The use of head sets is known in the prior art. More specifically, head sets heretofore devised and utilized are known to consist basically of familiar, expected and obvious structural configurations, notwithstanding the myriad of designs encompassed by the crowded prior art which have been developed for the fulfillment of countless objectives and requirements.

Known prior art head sets include U. S. Pat. No. 5,191,602; U.S. Pat. No. 4,754,484; U.S. Pat. Des. No. 339,355; U.S. Pat. No. 5,177,784; U.S. Pat. No. 4,175,217; and U.S. Pat. Des. No. 346,380.

In these respects, the hands free phone system according to the present invention substantially departs from the conventional concepts and designs of the prior art, and in so doing provides an apparatus primarily developed for the purpose of allowing convenient mobile hands free communication with a phone.

SUMMARY OF THE INVENTION

In view of the foregoing disadvantages inherent in the known types of head sets now present in the prior art, the present invention provides a new hands free phone system construction wherein the same can be utilized for allowing convenient mobile hands free communication with a phone.

The general purpose of the present invention, which will be described subsequently in greater detail, is to provide a new hands free phone system apparatus and method which has many of the advantages of the head sets mentioned heretofore and many novel features that result in a new hands free phone system which is not anticipated, rendered obvious, suggested, or even implied by any of the prior art head sets, either alone or in any combination thereof.

To attain this, the present invention generally comprises a phone unit having a rectangular configuration with a top face having a first outlet for transmitting and receiving audio signals. The phone unit is further equipped with a second outlet for transmitting and receiving the audio signals from the first outlet via free space. Also included is an arm-mounted housing including a flexible pouch with a front face, a rear face and a periphery defining an open top. As shown in FIG. 3, the open top has a flap for selectively closing the same. The flap has a pair of apertures formed therein and the periphery has a pair of aligned slits. The housing further includes a flexible band with a height approximately equal to that of the pouch. The band has a pair of free ends each with a pile fastener mounted thereon. As such, the band is adapted to be slidably situated within the slits and the free ends coupled about an arm of a user. In use, the pouch is adapted to releasably receive the phone unit such that the outlets are accessible through the apertures of the flap. Also provided is a head set including a resilient U-shaped head mount having a first end with a pad mounted thereon. A second end of the head set is equipped with an earphone for transmitting signals. An arm has an inboard end coupled to the second end of the head set and extends therefrom. Coupled to an outboard end of the arm is a microphone for receiving signals. Note FIGS. 1 & 2. The earphone and microphone are both coupled to a wire with a jack for being releasably received in the first outlet for communicating audio signals. Shown in FIG. 4 is an antenna including a mount having a pair of rigid square plates. Each of such plates are coupled in parallel relationship via a top member for defining a slot. This slot is adapted to releasably receive a top edge of a window of a vehicle. An outboard one of the plates has a platform integrally coupled thereto for supporting a vertically oriented antenna. An inboard one of the plates has a wire extending therefrom which is connected to the antenna. The wire has a jack for being releasably received in the second outlet for facilitating the transmission of the audio signals via free space.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hands free phone system apparatus and method which has many of the advantages of the head sets mentioned heretofore and many novel features that result in a new hands free phone system which is not anticipated, rendered obvious, suggested, or even implied by any of the prior art head sets, either alone or in any combination thereof.

It is another object of the present invention to provide a new hands free phone system which may be easily and efficiently manufactured and marketed.

It is a further object of the present invention to provide a new hands free phone system which is of a durable and reliable construction.

An even further object of the present invention is to provide a new hands free phone system which is susceptible of a low cost of manufacture with regard to both materials and labor, and which accordingly is then susceptible of low prices of sale to the consuming public, thereby making such hands free phone system economically available to the buying public.

Still yet another object of the present invention is to provide a new hands free phone system which provides in the apparatuses and methods of the prior art some of the advantages thereof, while simultaneously overcoming some of the disadvantages normally associated therewith.

Still another object of the present invention is to provide a new hands free phone system for allowing convenient mobile hands free communication with a phone.

Even still another object of the present invention is to provide a new hands free phone system that includes a phone unit adapted for transmitting and receiving audio signals between a user and free space. An arm-mounted housing is provided for maintaining the phone unit on a user. A head set includes a resilient U-shaped head mount having an end with an earphone for transmitting signals and a microphone for receiving signals. The earphone and microphone are both coupled to a wire which in turn is coupled to the phone unit for communicating audio signals.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
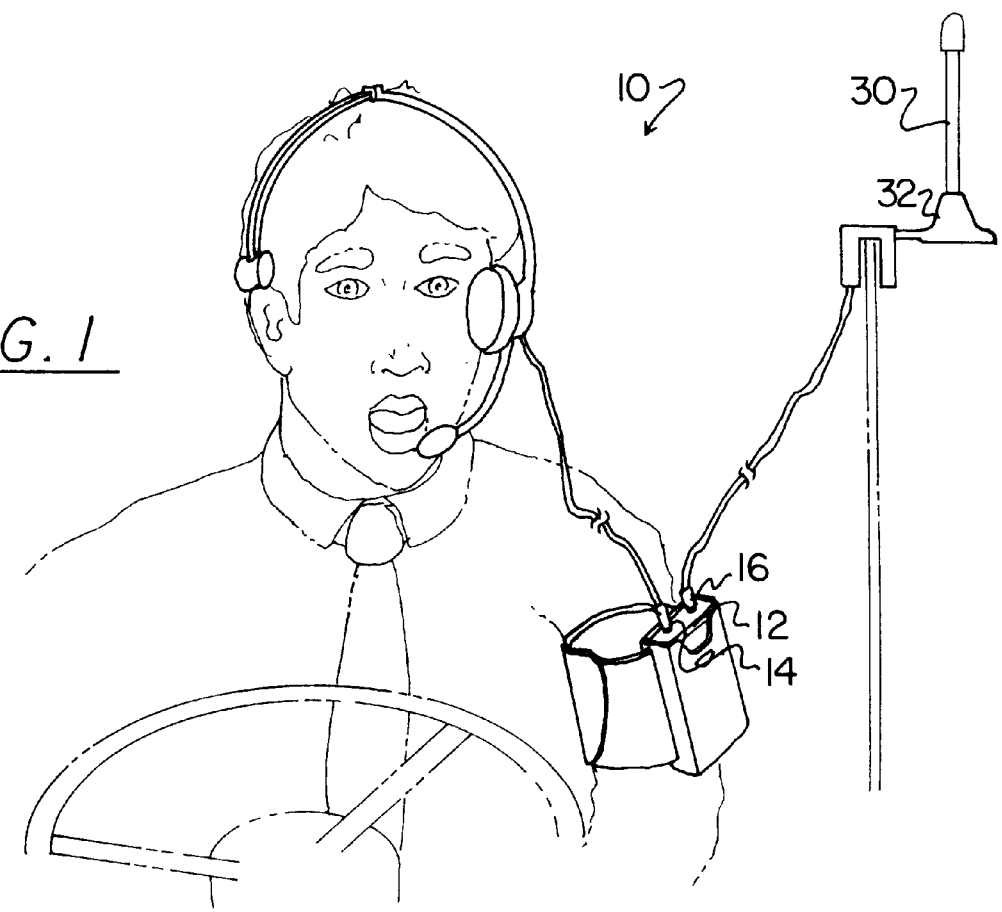
FIG. 1 is a front view of a new hands free phone system according to the present invention.
Figure 2:
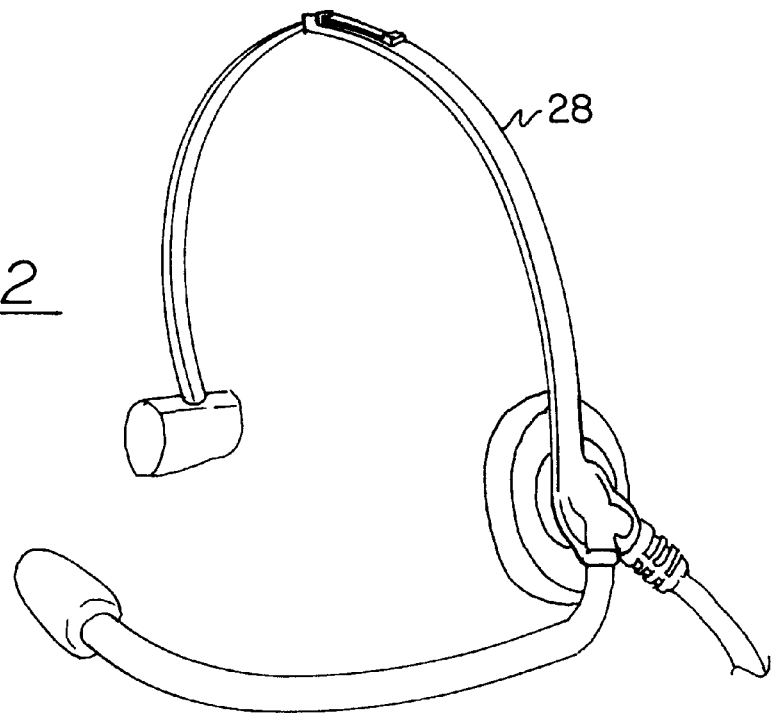
FIG. 2 is a perspective view of the head set of the present invention.

With reference now to the drawings, and in particular to FIGS. 1 through 4 thereof, a new hands free phone system embodying the principles and concepts of the present invention and generally designated by the reference numeral 10 will be described.

The present invention, designated as numeral 10, includes a phone unit 12 having a rectangular configuration with a top face having a first outlet 14 for transmitting and receiving audio signals. The phone unit is further equipped with a second outlet 16 for transmitting and receiving the audio signals from the first outlet via free space. In the preferred embodiment, the phone unit is a cellular phone. It should be noted, however, that the phone unit may take the form of any other type of phone or communication unit if desired.

Figure 3:
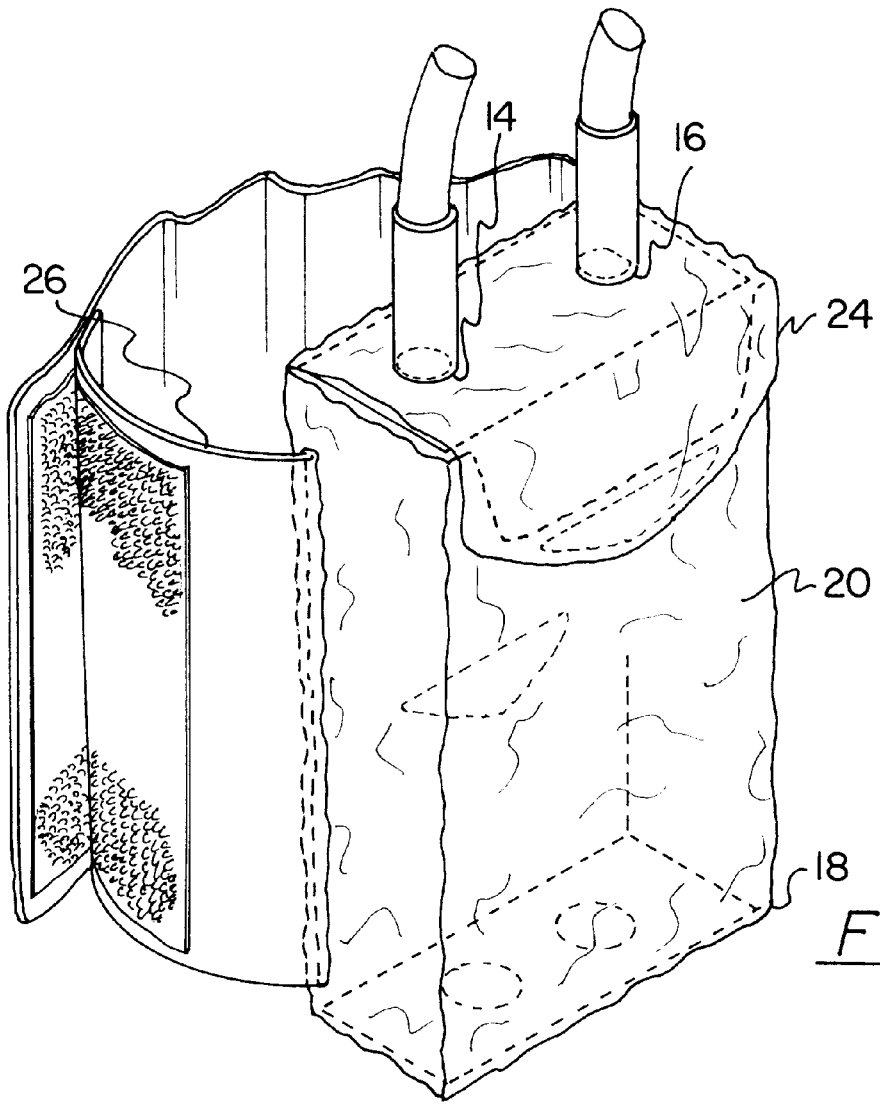
FIG. 3 is a perspective view of the arm-mounted housing of the present invention.

Also included is an arm-mounted housing 18 including a flexible pouch 20 with a front face, a rear face and a periphery defining an open top. As shown in FIG. 3, the open top has a transparent flap 24 for selectively closing the same. The flap is preferably selectively removable by way of pile fasteners. The flap has a pair of apertures formed therein for reasons that will become apparent hereinafter. Further, the flap is equipped with a pile fastener for securing the same in the closed orientation if desired. The periphery has a pair of aligned slits.

The housing further includes a flexible band 26 with a height approximately equal to that of the pouch. The band has a pair of free ends each with a pile fastener mounted thereon. As such, the band is adapted to be slidably situated within the slits and the free ends coupled about an arm of a user. In use, the pouch is adapted to releasably receive the phone unit such that the outlets are accessible through the apertures of the flap. A display of the phone unit may be view through the transparent flap. As an option, the bottom face of the pouch may be equipped with apertures for receiving any additional jacks or the like. It should be noted that the front face of the housing has a cut out formed therein adjacent to the open top thereof. This allows convenient access to the phone unit.

Also provided is a head set including a resilient U-shaped head mount 28 having a first end with a pad mounted thereon. A second end of the head set is equipped with an earphone for transmitting signals. An arm has an inboard end coupled to the second end of the head set and extends therefrom. Coupled to an outboard end of the arm is a microphone for receiving signals. It is imperative that the microphone be covered with a foam lining to prevent wind induced noise. Note FIGS. 1 & 2. The earphone and microphone are both coupled to a wire with a jack for being releasably received in the first outlet for communicating audio signals. While not shown, the forgoing jack preferably has a clip for releasably receiving the head mount of the head set when not in use.

Figure 4:
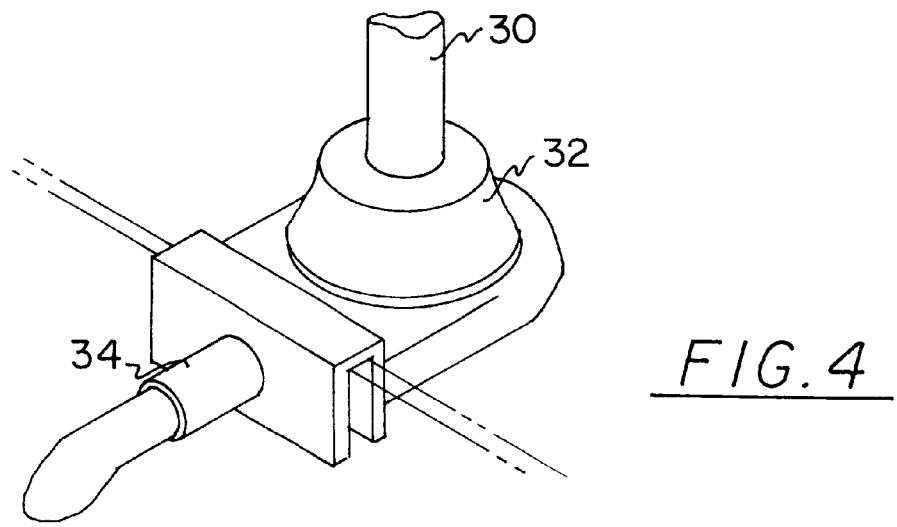
FIG. 4 is a perspective view of the antenna mount of the present invention.

Shown in FIG. 4 is an antenna 30 including a mount 32 having a pair of rigid square plates. Each of such plates are coupled in parallel relationship via a top member for defining a slot. This slot is adapted to releasably receive a top edge of a window of a vehicle. An outboard one of the plates has a platform integrally coupled thereto for supporting a vertically oriented antenna. An inboard one of the plates has a wire extending therefrom which is connected to the antenna. Such connection is afforded through the top member. It should be further noted that the wire has a grommet 34 which functions as a handle. The wire has a jack for being releasably received in the second outlet for facilitating the transmission of the audio signals via free space.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hands free phone system comprising, in combination:

a phone unit having a substantially rectangular configuration with a top face having a first outlet for transmitting and receiving audio signals and a second outlet for transmitting and receiving the audio signals from the first outlet via free space;

an arm-mountable housing including a flexible protective pouch with a front face, a rear face and a periphery defining an interior, the pouch having an open top, the open top having a flap for selectively closing the same, the flap having a pair of apertures formed therein and the periphery having a pair of aligned slits formed therein, the pouch having a bottom wall with a pair of apertures for permitting cords to pass out of the housing further including a flexible band with a height approximately equal to that of the pouch and having a pair of free ends each having a pile fastener mounted thereon such that the band is adapted to be slidably situated within the slits through the interior of the arm-mountable housing, and the free ends being coupled about an arm of a user, whereby the pouch is adapted to releasably receive the phone unit such that the phone unit is substantially completely enclosed by the pouch, while the outlets are accessible through the apertures of the flap;

a head set including a resilient U-shaped head mount having a first end with a pad mounted thereon and a second end with an earphone for transmitting signals and an arm having an inboard end coupled to the first end and extending therefrom with a microphone coupled to an outboard end thereof for receiving signals, the earphone and microphone both coupled to a wire with a jack for being releasably received in the first outlet for communicating audio signals; and an antenna including a mount having a pair of rigid square plates each coupled in parallel relationship via a top member for defining a slot adapted to releasably receive a top edge of a window of a vehicle, an outboard one of the plates having a platform integrally coupled thereto for supporting a vertically oriented antenna and an inboard one of the plates having a wire extending therefrom which is connected to the antenna, the wire having a jack for being releasably received in the second outlet for facilitating the transmission of the audio signals via free space.

2. A hands free phone system comprising:

a phone unit adapted for transmitting and receiving audio signals between a user and free space;

an arm-mountable housing for maintaining the phone unit on a user, the arm-mountable housing including a flexible protective pouch with a front face, a rear face and a periphery defining an interior, the pouch having an open top, the open top having a flap for selectively closing the same, the housing further including a flexible band with a height approximately equal to that of the pouch and having a pair of free ends each having a pile fastener mounted thereon coupled to the pouch such that the free ends being coupled about an arm of a user, whereby the pouch is adapted to releasably receive the phone unit such that the phone unit is substantially completely enclosed by the pouch;

a head set including a resilient U-shaped head mount having an end with an earphone for transmitting signals and a microphone for receiving signals, the earphone and microphone both coupled to a wire which in turn is coupled to the phone unit for communicating audio signals; and an antenna electrically connected to the phone unit and having a mount for releasably mounting onto a vehicle, wherein the antenna has a slot for mounting to a top edge of a window of the vehicle, the phone unit having an outlet for releasably receiving a jack mounted on an end of a wire connected to the antenna.

3. A hands free phone system as set forth in claim 2 wherein the housing includes a pouch with a band for coupling with the arm of the user.

4. A hands free phone system as set forth in claim 3 wherein the band has a pair of ends each with a coupling means mounted thereon.

5. A hands free phone system as set forth in claim 2 wherein the phone unit has an outlet for releasably receiving a jack mounted on an end of the wire.

6. A hands free phone system as set forth in claim 2 wherein the phone unit is a cellular phone.

* * * * *